C. W. SPONSEL.
WHEELED VEHICLE.
APPLICATION FILED SEPT. 10, 1919.
1,380,119.
Patented May 31, 1921.
3 SHEETS—SHEET 1.
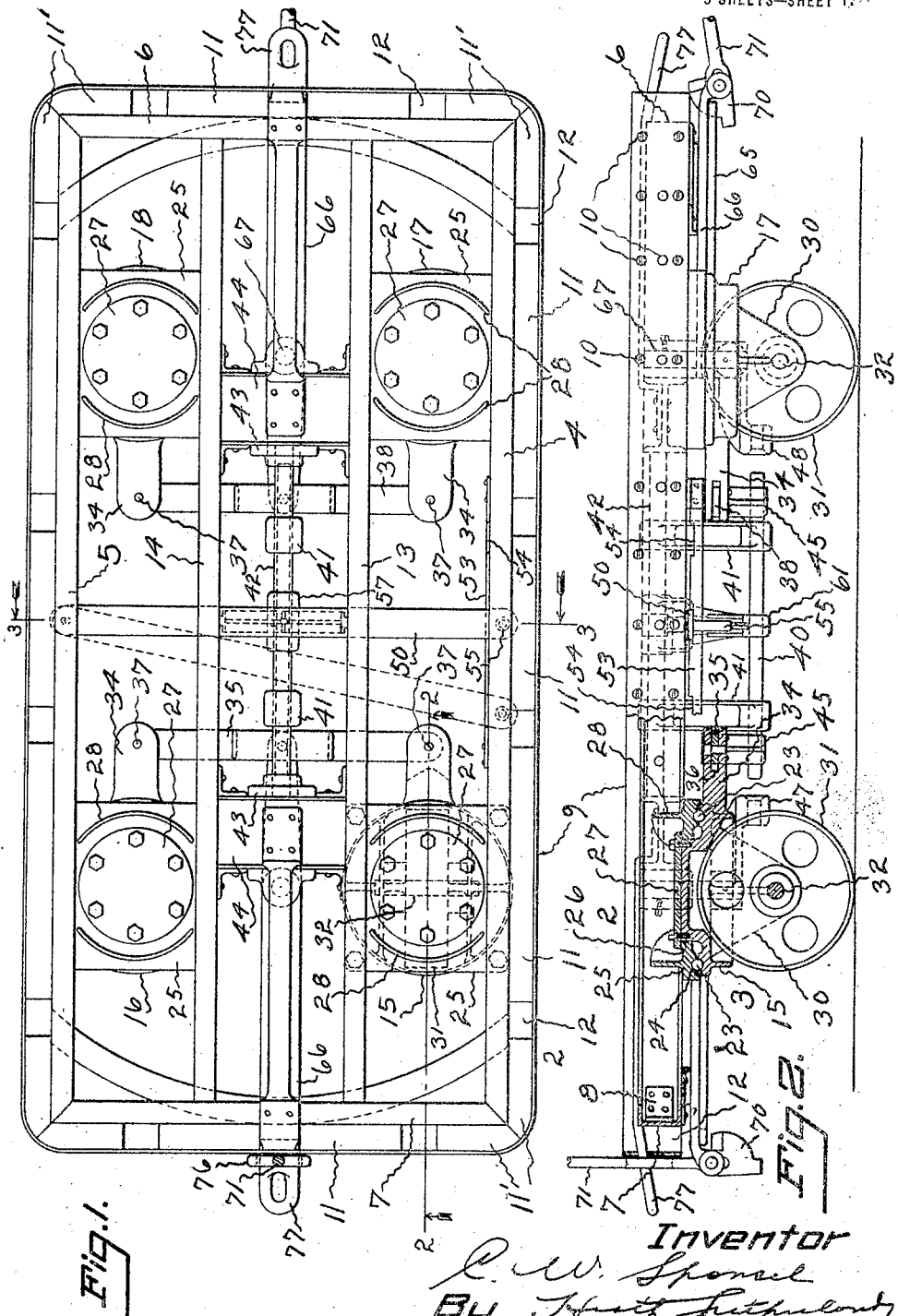
Inventor
C. W. Sponsel
By
Attorney

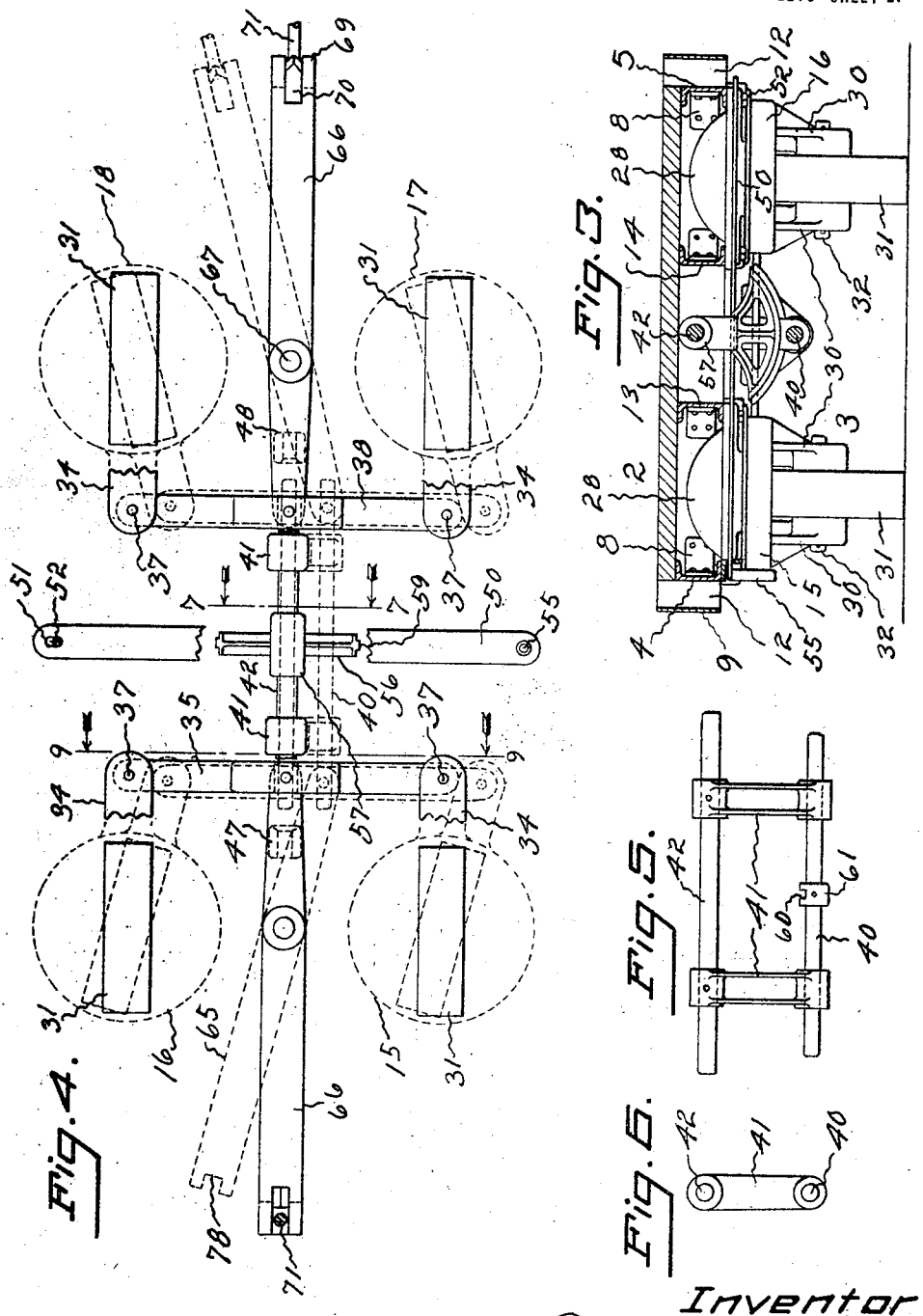

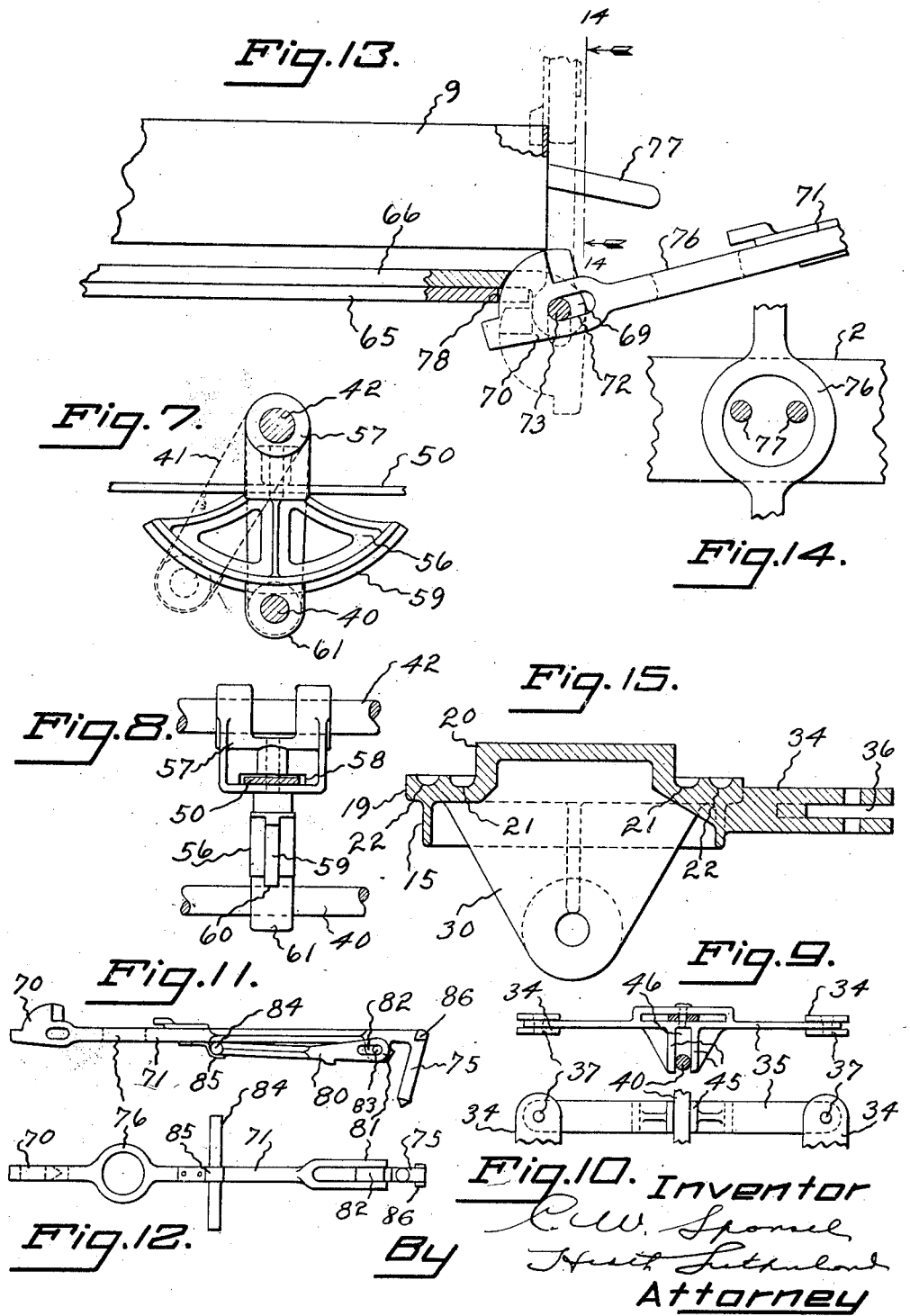

UNITED STATES PATENT OFFICE.

CHARLES W. SPONSEL, OF HARTFORD, CONNECTICUT, ASSIGNOR TO THE FAIRBANKS COMPANY, OF NEW YORK, N. Y., A CORPORATION OF NEW JERSEY.

WHEELED VEHICLE.

1,380,119.    Specification of Letters Patent.    Patented May 31, 1921.

Application filed September 10, 1919. Serial No. 322,857.

*To all whom it may concern:*

Be it known that I, CHARLES W. SPONSEL, a citizen of the United States, residing at Hartford, in the county of Hartford and State of Connecticut, have invented certain new and useful Improvements in Wheeled Vehicles, of which the following is a specification.

This invention relates to wheeled vehicles. It is along the same broad lines as that set forth in my application Serial No. 302,589 filed June 7, 1919. The invention may be incorporated with advantage in vehicles of different kinds although it is of especial advantage when embodied in a trailer truck in which it is the custom to couple one or several in a train to a power propelled tractor. The vehicle has desirably four swiveling wheels arranged in longitudinally-separated pairs, that is they turn about vertical axes and one of the important features of the invention, is in the provision of means by which one set may be locked against swiveling movement the truck being steered by the opposite set or pair of vice versa. In connection with the vehicle I prefer to provide draw-bars and means by which only one may be in action at a time, the other being positively locked inactive by interlocking means, the draw means being mutually dependent upon each other. Another important feature is that the base of the wheels is a constant one.

In the drawings accompanying and forming a part of the present specification, I have shown in detail one of the many different forms of embodiment of the invention which to enable those skilled in the art to practice said invention will be set forth fully in the following description. I am in no sense restricted to this particular disclosure. I may depart therefrom in many respects within the scope of the invention defined by the claims following said description.

Referring to said drawings:

Figure 1 is a top plan view of a wheeled vehicle involving the invention, the floor board being removed.

Fig. 2 is a side elevation partly in section of the same, the section being on the line 2—2 of Fig. 1.

Fig. 3 is a transverse section on the line 3—3 of Fig. 1.

Fig. 4 is a plan view of certain bearings and coöperating parts, the bearings being shown by dotted lines and the dotted lines also illustrating certain of the elements in shifted positions.

Fig. 5 is a detail showing two bars and the connections therebetween.

Fig. 6 is an elevation as seen from the end of Fig. 5.

Fig. 7 is a cross section on the line 7—7 of Fig. 4.

Fig. 8 is a view as seen from the left of Fig. 7.

Fig. 9 is a cross section on the line 9—9 of Fig. 4.

Fig. 10 is a bottom plan view of the parts appearing in Fig. 9.

Fig. 11 is a side elevation of a draw element.

Fig. 12 is a top plan view of the same.

Fig. 13 is a side elevation of an end portion of the truck, parts of the draw and steering members and pull-member, the pull-member being shown in its two extreme positions by full and dotted lines respectively.

Fig. 14 is a section on the line 14—14 of Fig. 13 looking in the direction of the arrows.

Like characters refer to like parts throughout the several views which are on different scales. Where I have applied section indicating lines, I have associated therewith arrows to show the point of view.

The truck includes in its structure desirably a body and a running gear both of which may vary. Yet I will describe somewhat in detail those forms which have been selected for illustration in the drawings. The body shown is denoted in a general way by 2 and the running gear in a general way by 3.

The body 2 as shown comprises two parallel side members as 4 and 5 and two parallel end members as 6 and 7 generally of metal and mitered at their corners and united together by angle brackets as 8 fastened in place by rivets, bolts or otherwise. Surrounding the rectangular structure made up of the two side bars 4 and 5 and the end bars 6 and 7 is a practically rectangular member 9 which may be held in place by bolts or rivets as 10 passing through the rectangular member 9 and also through the bars 4, 5, 6 and 7 respectively. This rectangular member 9 is really not exactly rectangular, its corners being desirably somewhat rounded as shown in Fig. 1. Between the surrounding member 9 and the respective side and end bars 4, 5, 6 and 7, I dispose the blocks or filling pieces 11 which may be of wood, metal or composition, the blocks or filling pieces 11 at the corners being denoted by 11' and being rounded to fit snugly the rounded corners of the surrounding member 9. The lower edge of the surrounding member 9 is practically in the plane of the under faces of the sides and ends 4, 5, 6 and 7 although it extends above the upper surfaces thereof as shown in Fig. 2 to give ample support and stability for posts or stakes which are introduced into the spaces or openings 12 between the ends of the filling pieces or blocks 11 and 11' as shown in Fig. 1. In addition to the members 4, 5, 6 and 7 I may extend between the members 6 and 7, parallel with and spaced from each other and also parallel with and spaced from the sides 4 and 5 the struts or beams 13 and 14 which may be of I-form or otherwise. The parts 4 to 7 inclusive may be of channel form with their channels facing inwardly.

As I will later explain there are four wheels and each of these wheels is associated with a bearing, the four bearings being denoted by 15, 16, 17 and 18. They appear in Figs. 1 and 2 and one of them as the bearing 15 is shown in detail in Fig. 15 so that a detailed description made of this one 15 will apply to the others as they are as shown the same in construction and mounting. Said bearing 15 includes a body 19 practically in the form of a circular plate or disk from the center of which rises the practically circular hollow projection 20 surrounded on the upper side by two concentric races or grooves 21 and 22 the race 22 being adapted to receive a number of anti-friction rollers such as balls 23 which fit a like race 24 in the under side of the plate 25. The four plates 25 are fastened by bolts, screws or otherwise to the sides 4 and 5 and also to the struts or beams 13 and 14 as shown in Fig. 1. The circular projections 20 to which I have referred extend freely through the circular openings 26 in the respective plates 25 the upper surfaces of the projections 20 being flush with the upper sides of the respective plates 25 and having fastened thereto as by screws the plates 27 which overlie the respective plates 25 as shown in Fig. 2. This is a simple way of holding the bearing or box 15 in assembled relation with its fixed bearing or plate 25. For strength the several plates 25 may have on the upper sides the segmental wings 28. The bearings or boxes 15, 16, 17 and 18 are furnished with depending arms 30 each bearing or box having two of such arms which receive between them wheels 31 respectively carried by shafts or axles 32 supported by and between the respective pairs of arms 30.

Each of the bearings or boxes 15, 16, 17 and 18 is furnished on its inner side with a radial arm or extension 34 the arms or extensions presenting a convenient means in connection with other instrumentalities as I will later set forth for securing the movement of the four wheels in pairs or for swiveling one pair while another pair is held against such action. This swiveling movement of a wheel is about an axis perpendicular to its axis of rotation, being vertical or practically vertical.

As I have virtually set forth, there may be times when it is desirable if not essential to hold one pair of wheels against turning movement about vertical axes while the other pair is free for movement about such axes or vice versa, or reversely there might be instances where the wheels of both pairs should move about such vertical axes. These axes are located at the corners of a rectangle. The wheels 31 associated with the respective bearings or brackets 15 and 16 practically directly coöperate and the same observation applies to the wheels 17 and 18. The wheels on the left in Figs. 1 and 2 may swivel while those on the right do not or vice versa while both pairs may thus swivel. The two wheels 31 at the left in Figs. 1 and 2 are as shown connected by the cross bar 35, the ends of this cross bar or plate fitting notches 36 in the arms 34 and being pivoted therein as at 37. It is therefore clear that upon the endwise or longitudinal movement of the cross bar or strip 35 the two bearings 15 and 16 will have a swiveling movement. The bearings 17 and 18 at the right are equipped with like radial arms or extensions 34, all the extensions extending inwardly as shown. The arms or extensions 34 of the bearings or boxes 17 and 18 are connected by a bar or strip 38 associated with the two other arms, the pivots being also denoted by 37. On the endwise movement of this tie or connecting bar or strip 38 it will be clear that the two bearings 17 and 18 at the right in Figs. 1 and 2 are swiveled. I provide as will be hereinafter explained, for connecting a coupling member to the two bars or strips 35 and 38.

In conjunction with said two cross bars or strips 35 and 38 I provide coupling means by which they may be associated together for concurrent movement or by which either or both of them may be locked against any movement or by which either may be connected to the coupling member while the other is locked. The means for effecting these actions involves a coupling member as 40 (Fig. 5) having an endwise slidable movement in duplicate arms 41 fastened at their upper ends to a rock shaft 42, supported for oscillation at its ends by brackets as 43 extending inwardly from the fixed bars 44 disposed between and united to the beams 13 and 14 as shown best in Figs. 1 and 2.

The cross bars 35 and 38 are furnished practically centrally thereof, with the pendant projections 45 having openings as illustrated in Fig. 2, to simultaneously receive the coupling member 40. The coupling member 40 is shown in its middle position best in Fig. 2 at which time it is in connection with the cross bars or strips 35 and 38 so that at this time they can be concurrently moved as illustrated by dotted lines in Fig. 4 to effect swiveling movement of all four wheels. It will be understood that when said coupling member or as it might also be considered bolt 40 is in said neutral position it engages the two arms 45 so that when said coupling member or bolt is swung it causes the two cross bars or strips 35 and 38 to move simultaneously endwise.

On a fixed part of the running gear and about mid way of the transverse extent thereof are two catch members 47 and 48 as seen best in Fig. 2, the coupling member or bolt 40 being free of them both as illustrated in said view. By moving the coupling member or bolt 40 to the left it is introduced into the opening or orifice of the fixture or bracket 47 in view of which circumstance the cross bar 35 at the left will be effectually locked against endwise movement. By projecting the right end tip of the coupling member or bolt 40 into the opening of the bracket or fixture 48 it will be clear that the cross bar or strip 38 is locked solidly against endwise movement. Therefore both strips or cross bars 35 and 38 may be freed for the necessary endwise movement or either of them may be locked. This is a way of advantageously obtaining the desired condition.

It should be stated at this time that the coupling member or bolt 40 can only be moved endwise to enable it to subserve certain of its desired offices, when it is in its neutral or central position or is in vertical line with the shaft 42. I have shown a convenient way of effecting the operation of the coupling member or bolt 40, which I will now describe. I provide an actuator as 50 which may as shown best in Figs. 1 and 4 consist of a lever having at its tail or rear end the longitudinal slot 51 to receive the stationary pin or stud 52 supported by some fixed part of the vehicle. This arrangement permits of the endwise or longitudinal movement, to a limited extent, of the actuator or lever 50 and as a result insures its handle or manipulating end moving in a straight or definite path notwithstanding the fact that the actuator or lever has a swinging movement. The front portion of the actuator or lever traverses a detent as 53 in the form of a bar having three notches 54 in its upper side to be successively entered by the lever 50 when in its three positions. The lever in addition is furnished with a plunger 55 adapted to engage a fixed part of the vehicle, as the side bar 4, to hold the lever temporarily in its fixed position and against accidental movement. I have shown a segment or sector 56 rigid with the block 57 pivoted in some convenient way to the rock shaft 42. The block 57 has a slot 58 through which the lever 50 freely passes as shown for instance in Figs. 7 and 8. On the under side of the curved portion of the segment or sector 56 is a flange 59 fitting a slot 60 in the block 61 fastened to the shaft 40.

It will be assumed that the two cross pieces 35 and 38 are in their mid positions as shown in Fig. 1 and that the lever 50 is also in its mid position as illustrated by full lines in said Fig. 1. It will be assumed in this event that it is desired to lock the cross piece 35 against movement. In this case the following procedure will be adopted: The lever 50 will be grasped at its outer end and lifted from the middle notch 54 and swung to the left in Figs. 1 and 2 or to the dotted line position. The segment 56 will be slid therewith thus moving the block 61 and as a result the coupling member or bolt 40 and projecting the same into the opening of the fixture 47 thus effectually locking the strip or cross piece 35 against movement and as a result positively preventing independent lateral movement of the wheels 31 at the left about vertical axes.

The truck is provided with means so that it may be drawn from either end that is either toward the right or the left in Figs. 1 and 2 as I will later explain. There is also means by which either the right pair of wheels may be made to swivel while the left pair does not or vice versa or both pairs of wheels may swivel as I have briefly already mentioned. The power for effecting the movement of the truck or vehicle may be of any nature. For instance the vehicle or truck may be connected with a tractor or anything else for that matter furnishing the necessary power, or it may be moved from place to place by a hand pull. Desirably when the mechanism at one end of the vehicle or truck is in action for pulling, the complemental mechanism should be out of action and I will also explain hereinafter how this may be accomplished. I deem it proper to observe at this point although I believe it is so understood, that I am not restricted to the particular construction being described for I may use other means within the spirit of the invention as expressed in my claims.

Supported below each end portion of the body 2 centrally of the transverse extent and extending longitudinally thereof are the two bars 65 and 66 (Fig. 13). It should be explained that I am describing the mechanism at the right in Figs. 1, 2 and 4 (a duplicate of that at the left thereof), and which is shown in detail in said Fig. 13. The lower bar 65 of these superposed bars is jointed as by pivoting to the cross bar 38 practically centrally thereof. It will be clear therefore, that when this bar 65 is swung the cross bar 38 is moved endwise and it will be evident that if the cross bar 35 is in coupled relation with the cross bar 38 it will also be moved in an endwise and similar direction. The pivot 67 for the bar 66 also acts in a like capacity for the longer bar 65.

The upper or draft bar 66 of these two superimposed bars is pivoted at 67 to the frame of the vehicle and is provided with a down turned head or front end 69 of forked construction which receives between its sides or branches the back end portion 70 of a pull member such as the rod 71 the said back end portion 70 having a longitudinal slot 72 which receives the pin 73 extending between the sides or branches of the head 69. The pull rod 71 therefore, is capable of limited longitudinal movement. This pull rod terminates at its forward end, in a down turned arm or projection 75 which is inclined backwardly and which may hook into an eye or something of a similar nature upon a tractor. The rod 71 near its rear end has a circular portion 76 which coöperates with centering means as the fixed yoke 77 on the adjacent end of the body as shown best in Fig. 14.

The rod 71 is shown in operative relation by full lines in Fig. 13 at which time the segmental or coupling portion 70 is fitted in the notch 78 at the outer or forward end of the steering bar 65. It will be clear that the rod 71 when in the full line position in Fig. 13 or as shown on the right in Fig. 2 can be utilized to pull the vehicle and it will also be evident that this pull rod is in coupled relation with the steering bar 65 so that when the rod 71 is moved laterally, the bars 65 and 66 will be swung about their axes thereby, owing to the connection of the bar 65 with the cross bar 38 moving the latter longitudinally and if said cross bar 38 is connected or coupled with the companion cross bar 35 the latter will be correspondingly moved. The draw rod 71 is uncoupled from the bar 65 by the moving of the rod 71 to perpendicular position and it can be only brought in such relation when the two bars 65 are in their neutral positions or in longitudinal line as shown by full lines in Fig. 4 for instance. When this longitudinal alinement is present, the rod 70 can be swung to upright position as illustrated by dotted lines at which time the yoke 77 will enter the annular portion 76 as shown in Fig. 14 and at the same time the coupling portion 71 will be wholly moved out of the slot 78. If the two sets of bars 65 and 66 should not be in exact longitudinal alinement when the rod 71 is swung toward its perpendicular position the yoke 77 acting as stop means, will prevent the full movement of the rod 71 by abutting against the yoke and prevent its complete movement and the movement of the segmental portion 70 out of the notch 78.

There may be loosely connected to the under forward side of the pull rod 71 the auxiliary pull piece 80 having a fork 81 at an end to straddle the lug or projection 82 of the pull rod and longitudinally slotted to receive the studs 83 extending oppositely from the lug as shown in Fig. 11. The operative end of this auxiliary member 80 is provided with a cross-head 84 which may be received in a clip as 85 fastened to the under side of the pull rod 71 as shown in Figs. 11 and 12. By the movement of the auxiliary member 80 in a forward direction or toward the right for example in Fig. 1 the cross-head 84 may be freed from the clip 85 and the auxiliary member 80 swung forward and brought into abutment against the stop 86 at the extreme front end of the pull rod 71 when it is desired to lengthen the pull rod or to render it better adapted for hand action.

What I claim is:

1. A vehicle comprising a body, two sets of rotary wheels in coöperative relation with the body, the wheels of one of the sets being mounted for swiveling movements about axes transverse to their axes of rotation, a rock shaft between the sets of wheels, a locking member below and connected operatively with the rock shaft, a segment rigid with the rock shaft and having a slidable connection transversely of the vehicle, with the locking member, a hand lever for moving the segment laterally to thereby effect the longitudinal movement of the locking member away from its neutral position, and means engageable by the locking member when moved away from said neutral position, to prevent swiveling movement of said swiveling wheels.

2. A vehicle comprising a body, two sets of rotary wheels in coöperative relation with the body, bearings to which the wheels are connected, the bearings of one set of wheels being mounted for swiveling movements about axes transverse to the axes of rotation of their wheels, a bar connected to the swiveling bearings, and means accessible from the side of the vehicle between the sets of wheels for at will locking said bar to the body of the vehicle.

3. A vehicle comprising a body, a plurality of sets of rotary wheels in coöperative relation with the body, bearings to which the respective wheels are connected, the bearings being mounted for movements about axes transverse to the axes of rotation of the wheels, a bar connecting the bearings of the respective sets of wheels, and means accessible from the side of the vehicle between the sets of wheels for at will alternately locking the bars to the body of the vehicle.

4. A vehicle comprising a body, a plurality of sets of wheels, bearings to which the respective wheels are rotatively connected, at least one set of bearings being mounted for swiveling movements about axes transverse to the axes of rotation of the wheels thereof, means involving a cross bar, for connecting the swiveling bearings for concurrent movements, a steering-member jointed to the connecting bar, a draft member superposed upon the steering-member, a pull member flexibly connected to the draft member and having means for coupling the steering and the draft members together when the pull member is in operative or pulling position, the coupling means acting to release the steering and the draft members when the pull member is moved to inoperative or non-pulling position.

5. A vehicle comprising a body, a plurality of sets of wheels, bearings to which the respective wheels are rotatively connected, at least one set of bearings being mounted for swiveling movements about axes transverse to the axes of rotation of the wheels, means involving a cross bar, for connecting the swiveling bearings for concurrent movements, a pivotally mounted steering bar jointed to the connecting bar, a draft bar superposed with respect to the steering bar and also pivotally mounted, a pull rod flexibly connected to the draft bar and having means for coupling the steering and the draft bars together when the pull rod is in operative or pulling position, the coupling means acting to release the steering and the draft bars when the pull member is moved to inoperative or non-pulling position, and the vehicle having means to positively prevent the movement of the pull member to said inoperative position.

6. A vehicle comprising a body, a plurality of sets of rotary wheels in coöperative relation with the body, bearings to which the respective wheels are connected, the bearings being mounted for movements about axes transverse to the axes of rotation of the wheels, a bar connecting the bearings of the respective sets of wheels, a hand lever mounted upon the body, and means actuated by the hand lever for alternately locking the bars to the body of the vehicle.

7. A vehicle comprising a body, a plurality of sets of wheels, bearings to which the respective wheels are rotatively connected and mounted for swiveling movements about axes transverse to the axes of rotation of the wheels, means involving a cross bar for connecting the swiveling bearings for concurrent movements, means for alternately locking the cross bars to the body, a pivotally mounted steering bar jointed to each connecting bar, a pivotally mounted draft bar in coöperative relation with each steering bar, a pull rod flexibly connected to each draft bar, and having means for coupling together its coöperative steering and draft bars when the pull rod associated therewith is in operative position, and coupling means, for releasing the respective steering and draft bars when the respective pull members are moved to inoperative or non-pulling positions, the vehicle having means to positively prevent the movement of the respective pull bars to said inoperative positions.

8. A vehicle comprising a body, sets of wheels, bearings to which the respective wheels are rotatively connected and mounted for swiveling movements about axes transverse to the axes of the wheels, means involving a cross bar, for connecting the swiveling bearings for concurrent movements, a pivotally mounted steering bar jointed to the connecting bar, a draft bar in coöperative relation with the steering bar and flexibly mounted, a pull rod flexibly connected to the draft bar and having means for coupling the steering and the draft bars together when the pull rod is in operative position, the coupling means acting to release the steering and the draft bars when the pull member is moved to inoperative or non-pulling position, the vehicle having means to positively prevent movement of the pull member to said inoperative position.

In testimony whereof I affix my signature in the presence of two witnesses.

CHARLES W. SPONSEL.

Witnesses:
ELSIE M. ROBENSTEIN,
HEATH SUTHERLAND.